United States Patent
Alexander, Jr. et al.

[19]

[11] Patent Number: 6,064,675
[45] Date of Patent: May 16, 2000

[54] SHORT-CUT BRIDGING IN LAN EMULATION NETWORKS

[75] Inventors: Cedell Adam Alexander, Jr., Durham; Charles Allen Carriker, Jr., Cary; John Kevin Frick, Raleigh; Edward Joel Rovner, Chapel Hill; Matthew Blaze Squire; Deepak Vig, both of Raleigh, all of N.C.

[73] Assignee: International Business Machines Corporation, Armonk, N.Y.

[21] Appl. No.: 08/834,047

[22] Filed: Apr. 11, 1997

[51] Int. Cl.[7] .............................. H04L 12/28; H04L 12/56
[52] U.S. Cl. ..................... 370/401; 370/397; 709/218; 709/227
[58] Field of Search ..................................... 370/397, 401, 370/395, 389, 392, 400, 216; 395/200.5; 709/218

[56] References Cited

U.S. PATENT DOCUMENTS

| | | | |
|---|---|---|---|
| 4,850,042 | 7/1989 | Petronio et al. | 455/606 |
| 5,329,527 | 7/1994 | Ujihashi et al. | 370/85.13 |
| 5,581,552 | 12/1996 | Civanlar et al. | 370/396 |
| 5,600,644 | 2/1997 | Chang et al. | 370/404 |
| 5,777,994 | 7/1998 | Takihiro et al. | 370/395 |
| 5,805,805 | 9/1998 | Civanlar et al. | 395/200.5 |
| 5,812,552 | 9/1998 | Arora et al. | 370/401 |
| 5,835,481 | 11/1998 | Akyol et al. | 370/216 |
| 5,878,043 | 3/1999 | Casey | 370/397 |
| 5,892,912 | 4/1999 | Suzuki et al. | 709/218 |

*Primary Examiner*—Hassan Kizou
*Assistant Examiner*—John Pezzlo
*Attorney, Agent, or Firm*—John J. Timar

[57] ABSTRACT

An ATM communications network with several ELANs allows steady-state data to be passed between ATM attached devices which bypasses intermediate LECs and bridges. Connected to the ATM communications network is a bridge unit which includes a bridge and associated LECs. Also, an origination ATM attached device and a destination ATM attached device are attached to the ATM communications network via a first by a first ELAN and a second ELAN, respectively. The origination ATM attached device sends a request for an ATM address associated with the destination ATM attached device to the bridge, via the first ELAN. After some processing, the bridge returns the ATM address associated with the destination ATM attached device to the origination ATM attached device. This allows the origination ATM attached device to establish a shortcut VCC with the destination ATM attached device using the ATM address associated with the destination ATM attached device, thereby bypassing intermediate bridges and LECs.

34 Claims, 5 Drawing Sheets

SHORT-CUT BRIDGING IN LAN EMULATION NETWORKS

BACKGROUND OF THE INVENTION

1. Technical Field

The present invention relates generally to communications in an asynchronous transfer mode (ATM) network. More specifically, the present invention relates to communicating data between emulated local area networks (ELANs).

2. Description of the Related Art

In current ATM networks, most data which is sent from one ELAN to another may pass through a bridge and associated local area network emulation clients (LECs). However, passing all of this information through a bridge presents problems. First, the bridge/LEC combination can act as a bottleneck to the flow of information if the processing power of the bridge is not sufficient. It would therefore be desirable to allow one ATM attached device to communicate with another without involving the bridge. Such a system would remove the bridge as a potential performance bottleneck.

SUMMARY OF THE INVENTION

It is therefore one object of the present invention for clients on ELANs to directly communicate with each other in a manner that does not involve bridges in the steady-state data path.

It is yet another object of the present invention to provide these enhancements in a manner compatible with existing ATM networks, associated ELANs, and both transparent and source route bridges.

It is still another object of the present invention to provide a distributed LAN emulation (LE) service, i.e., for multiple LES/BUSes to service a set of LE clients which may communicate directly.

These and other objects are provided as follows. An ATM communications network with several ELANs allows steady-state data to be passed between ATM attached devices which bypasses intermediate LECs and bridges. Connected to the ATM communications network is a bridge unit which includes a bridge and associated LECs. Also, an origination ATM attached device and a destination ATM attached device are attached to the ATM communications network via a first by a first ELAN and a second ELAN, respectively. The origination ATM attached device sends a request for an ATM address associated with the destination ATM attached device to the bridge, via the first ELAN. After some processing, the bridge returns the ATM address associated with the destination ATM attached device to the origination ATM attached device. This allows the origination ATM attached device to establish a shortcut VCC with the destination ATM attached device using the ATM address associated with the destination ATM attached device, thereby bypassing intermediate bridges and LECs.

BRIEF DESCRIPTION OF THE DRAWINGS

The novel features believed characteristic of the invention are set forth in the appended claims. The invention itself, however, as well as preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
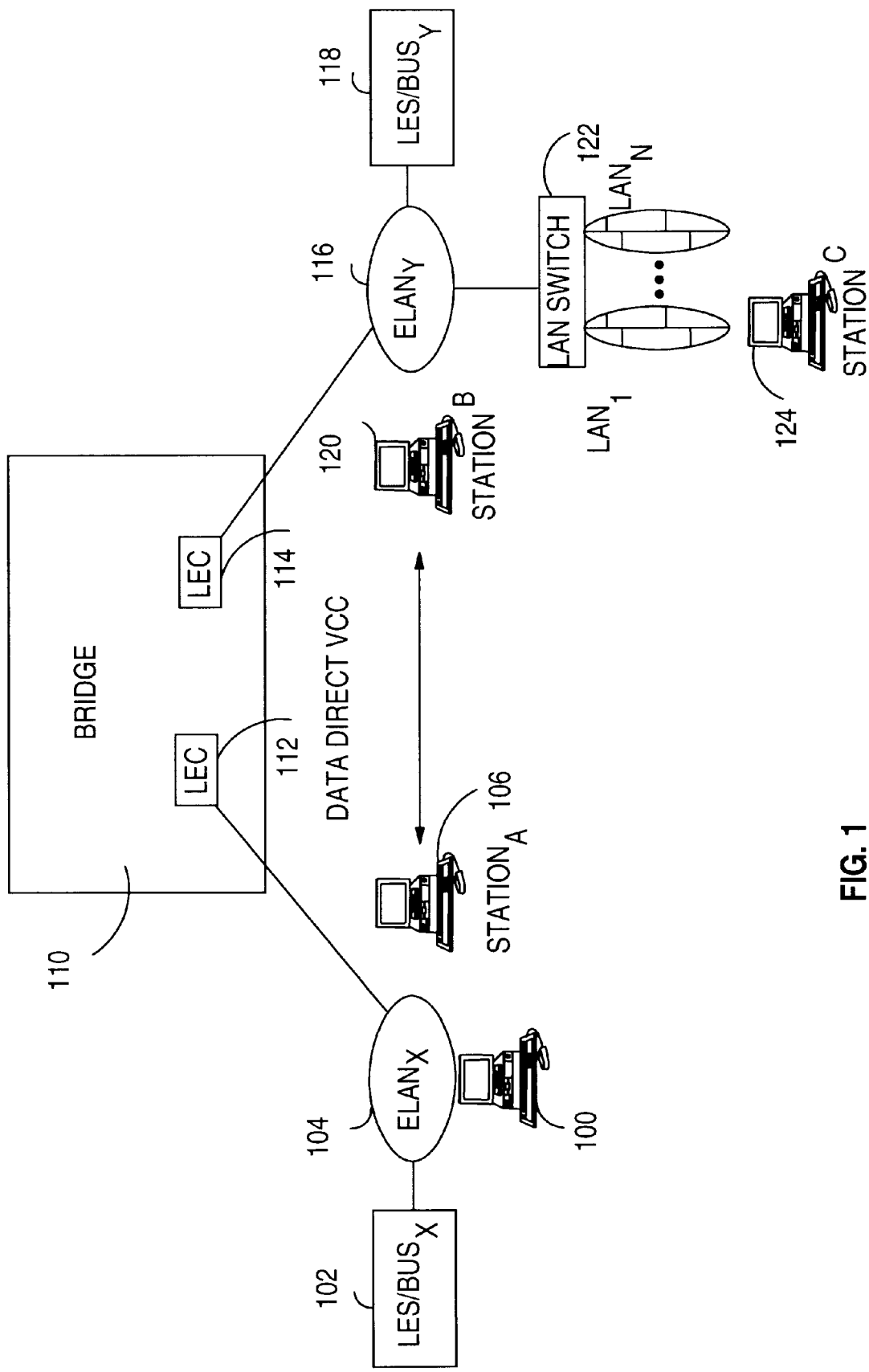
FIG. 1 illustrates an ATM network with a transparent bridge according to the present invention.

FIG. 1 illustrates an ATM network with a transparent bridge according to the present invention. In prior art systems, when device 106 on emulated local area network (ELAN) 104 sent information to device 120 on ELAN 116, the information would travel through LAN emulation client (LEC) 112 to bridge 110 to LEC 114, then on to device 120. Since all information transferred from ELAN 104 to ELAN 116 passed through LECs 112 and 114 and bridge 110, the intermediate LECs and bridge could be potential bottlenecks in these transmissions.

In the present invention, LECs 112 and 114, bridge 110, and LAN emulation server/broadcast and unknown servers (LES/BUSes) 102 and 118 have been modified to allow ELAN 104 to communicate to ELAN 116 with minimal involvement of LECs 112 and 114 and bridge 110. In the case of device 106 on ELAN 104, this is accomplished by having LEC 112 modify LAN emulation address resolution protocol (LE_ARP) Responses directed to device 106. The LE_ARP Responses are modified so that device 106 learns the ATM address associated with the destination device rather than the ATM address of an intermediate LEC or bridge.

For example, when device 106 wishes to communicate with device 120, it first issues a LE_ARP Request for the ATM address of device 120. LEC 112 receives the LE_ARP Request from device 106, and bridge 110 either answers the Request (if it has the MAC/ATM address pair corresponding to the MAC address in its cache) or, LEC 112 forwards the Request to LES 118 via LEC 114. If LEC 112 forwards the LE_ARP Request to LES 118, LES 118 will transmit a LE_ARP Response to LEC 114, which then forwards it to LEC 112.

When LEC 112 forms its own LE_ARP Response, or when it receives a response forwarded from LES 118, the LE_ARP Response will contain the ATM address associated with the destination MAC address instead of its own ATM address. LEC 112 will forward the LE_ARP Response to LES 102, which, in turn, will forward the LE_ARP Response to device 106. Device 106 will then set up a shortcut data direct virtual channel connection (shortcut VCC) with device 120, since it now has the ATM address associated with device 120.

Figure 2:
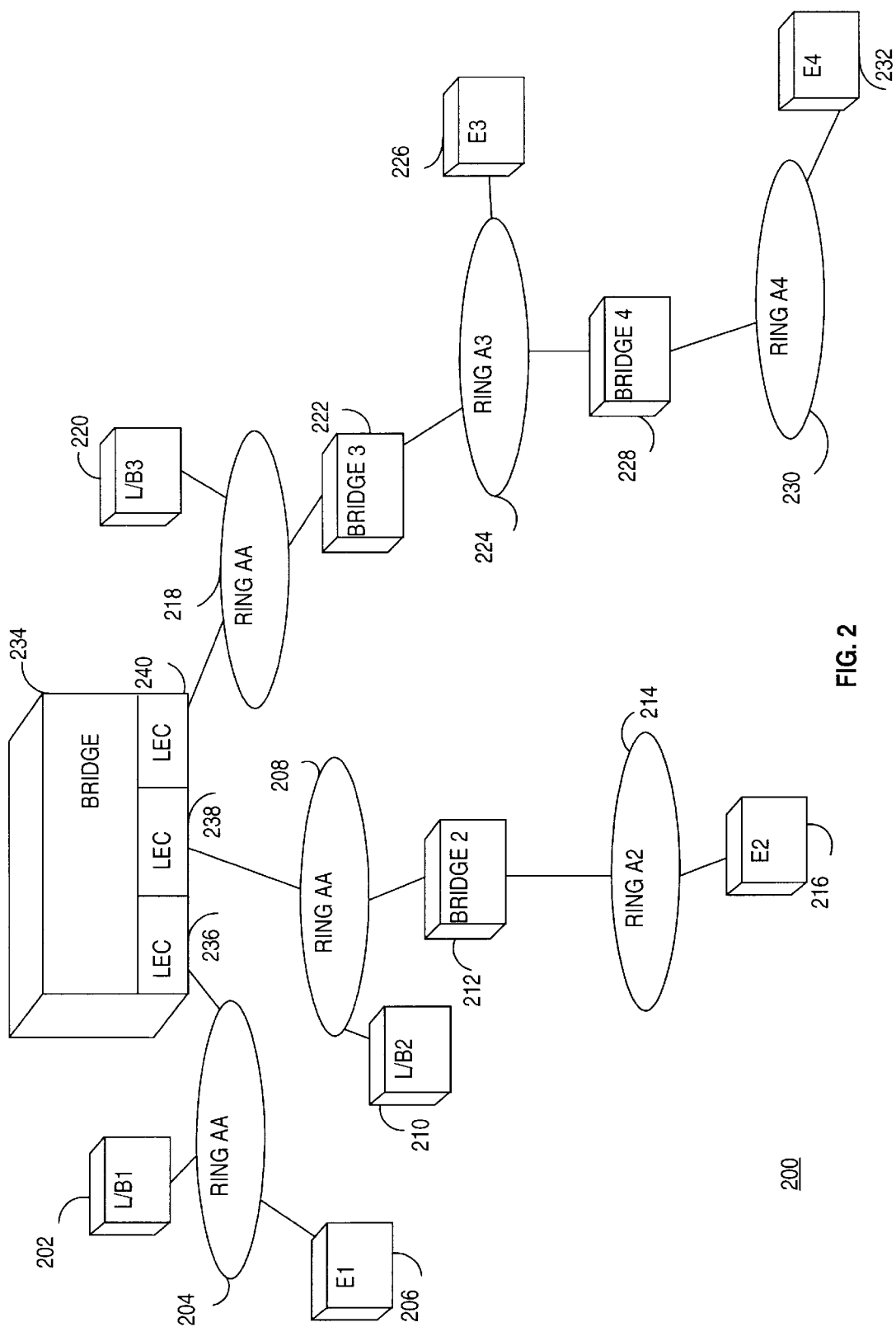
FIG. 2 illustrates an ATM network with a source route aware transparent bridge according to the present invention.

FIG. 2 illustrates a source route aware transparent bridge according to the present invention. Bridge 234 caches MAC/ATM address pairs in the same manner as the transparent bridge described in FIG. 1. Bridge 234 uses these MAC/ATM address pairs to allow ATM attached devices to establish data direct VCCs between themselves in the same manner as the transparent bridge. In addition to caching MAC/ATM address pairs, bridge 234 maintains a cache of route descriptor/ATM address pairs. Bridge 234 caches these route descriptors/ATM address pairs so that data direct VCCs can be established between devices that are not attached to a local ring. This manner of operation occurs when bridge 234 forwards data and LE control frames for destinations that are reachable through external bridges, such as bridge 212 and bridge 222.

It is an advantage of the present invention that it provides a distributed LAN emulation service, that allows direct communication between LE clients whereby the LE clients learn the destination ATM address of the other client by requesting and receiving that address from a bridge.

Network 200 in FIG. 2 consist of bridge 234 and LECs 236, 238 and 240. Attached to LEC 236 is ELAN 204. Attached to ELAN 204 is ATM attached device 206. ELAN 208 is attached to LEC 238, while ELAN 218 is attached to LEC 240. ELANs 208 and 218 are both assigned ring AA by bridges 212 and 222, respectively. Implicitly, ELAN 204 is also assigned ring AA, even though no source route bridge is attached to ELAN 204. Ring AA is referred to as the local ring for bridge 234. Attached to ELAN 208 is bridge 212, and attached to bridge 212 is legacy token ring segment 214 and device 216. Likewise, attached to ELAN 218 is bridge 222, legacy token ring segment 224, device 226, bridge 228, legacy token ring segment 230, and device 232.

As stated above, bridge 234 maintains a MAC/ATM address cache. This cache is used to supply the ATM address of ATM attached devices residing on the local ring to requesting devices. Upon obtaining the destination device's ATM address, these requesting devices can establish a shortcut VCC with the destination device.

If a requesting device wishes to obtain the ATM address of an ATM attached device which does not reside on the local ring, it will present bridge 234 with the route descriptor for that device. A route descriptor contains a bridge number and a ring number pair. This is unlike the transparent bridge described in FIG. 2, or the case for bridge 234 when the destination device resides on the local ring. Upon receiving a LE_ARP Request for the ATM address associated with a route descriptor, bridge 234 will respond with the ATM address associated with the route descriptor, or will take steps to determine the ATM address associated with the route descriptor, if that particular route descriptor/ATM pair is not in its route descriptor cache.

For example, ATM attached device 206 may wish to send data to token ring attached device 232. ATM attached device 206 will send a LE_ARP Request to bridge 234 with the route descriptor [ring A3, bridge 222] for token ring attached device 232. If the ATM address associated with this route descriptor is already stored in the route descriptor cache of bridge 234, bridge 234 will send the ATM address of bridge 222 to ATM attached device 206. ATM attached device 206 can then establish a shortcut VCC with bridge 222. If bridge 234 had not previously cached the route descriptor/ATM pair for bridge 222, bridge 234 would forward the LE_ARP Request out LECs 238 and 240. In this example, both LECs 238 and 240 are in the forwarding state. When bridge 234 receives a LE_ARP Response from LES 220 on ELAN 218, bridge 234 will cache this response in its route descriptor cache and will forward the ATM address associated with the route descriptor to ATM attached device 206. At this point, ATM attached device 206 will be able to establish a shortcut VCC to bridge 222.

Figure 3A:
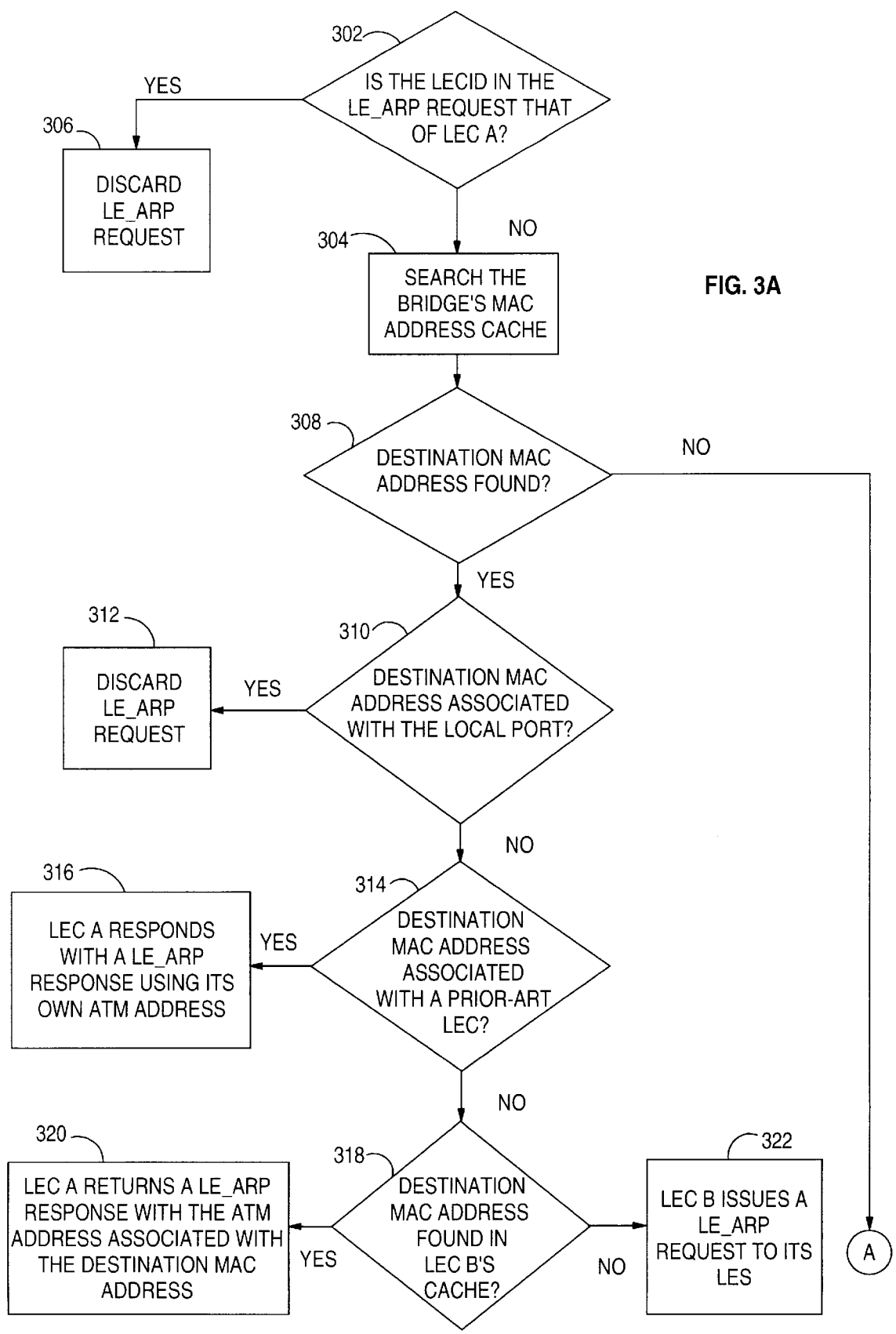
FIGS. 3A and 3B are flowcharts which illustrate the process of short-cut bridging applied to a transparent bridge according to the present invention.
Figure 3B:
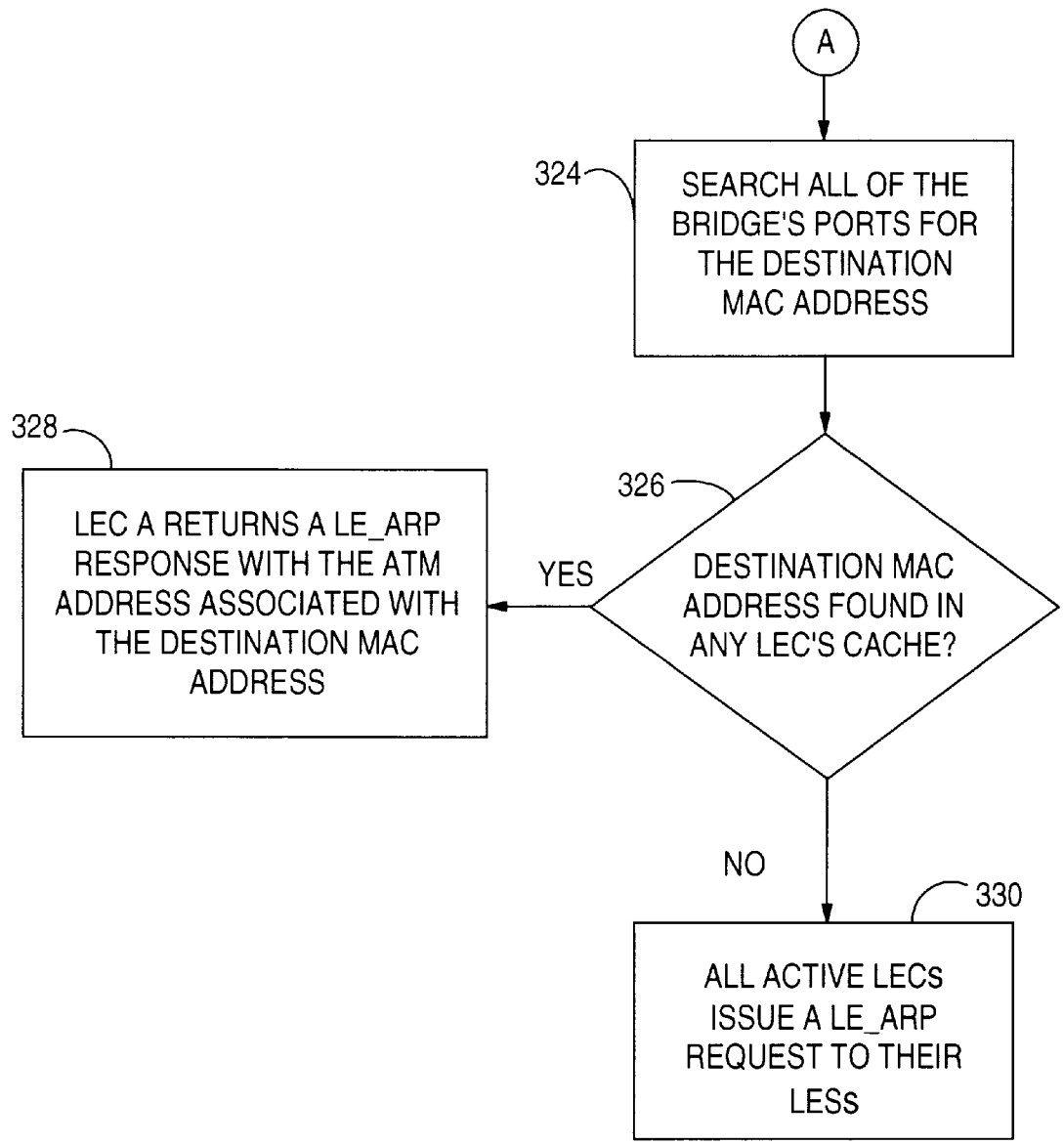

FIGS. 3A and 3B are flowcharts which illustrate the methods used by bridges and LECs operating according to the present invention. The process described in FIGS. 3A and 3B assumes a network having the devices of network 100, shown in FIG. 1. Initially, LEC 112 receives a LE_ARP Request. If the LECID in the LE_ARP Request is the LECID of LEC 112 (302), LEC 112 will discard the LE_ARP Request (306). If the LECID of the LE_ARP Request is not that of LEC 112, LEC 112 searches the bridge's MAC address cache for the destination MAC address contained in the LE_ARP target destination field (304). If the destination MAC address is found in the bridge's MAC address cache (308), and the destination MAC address is associated with the local port (310), the LE_ARP Request will be discarded (312).

If the destination MAC address found is not associated with the local port, the destination MAC address will be processed to determine if it is associated with a LEC which does not implement the present invention (314). If the destination MAC address is associated with a prior art LEC, LEC 112 will send a LE_ARP Response to the requesting device using its own ATM address (316). LEC 112's inserting of its own ATM address will allow the requesting device, device 106, to establish a shortcut VCC to LEC 112 as is known in the prior art. However, device 106 will be unable to establish a shortcut VCC with the destination device, device 120.

If the destination MAC address is not associated with a prior art LEC, the destination MAC address is further analyzed to determine if it was found in LEC 114's cache (318). If the destination MAC address was found in LEC 114's cache, LEC 112 will return a LE_ARP Response to the requesting device with the ATM address associated with the destination MAC address (320). As shown in FIG. 1, this would allow device 106 to establish a shortcut VCC with device 120, thereby bypassing LEC's 112 and 114 and bridge 110.

If the destination MAC address is not found in LEC 114's cache, LEC 114 issues a LE_ARP Request to its LES to retrieve the associated ATM address (322). This information will be forwarded to LEC 112 which in turn, will return a LE_ARP Response with the ATM address associated with the destination MAC address as was done in block (320).

Returning to block (308), if the destination MAC address was not found in the bridge's MAC address cache, processing continues with block (324), shown in FIG. 3B. After not finding the destination MAC address in the bridge's address cache, the LE_ARP caches of all of the bridges' ports operating according to the present invention will be searched for the destination MAC address (324). If the destination MAC address is found in any LEC's cache (326), LEC 112 will return to the requesting device a LE_ARP Response which includes the ATM address associated with the destination MAC address (328). If the destination MAC address is not found in any LEC cache, all active LECs (except the LEC that received the original LE_ARP Request) will issue a LE_ARP Request to their LESs in an attempt to find the destination MAC address and corresponding ATM address (330).

Figure 4:
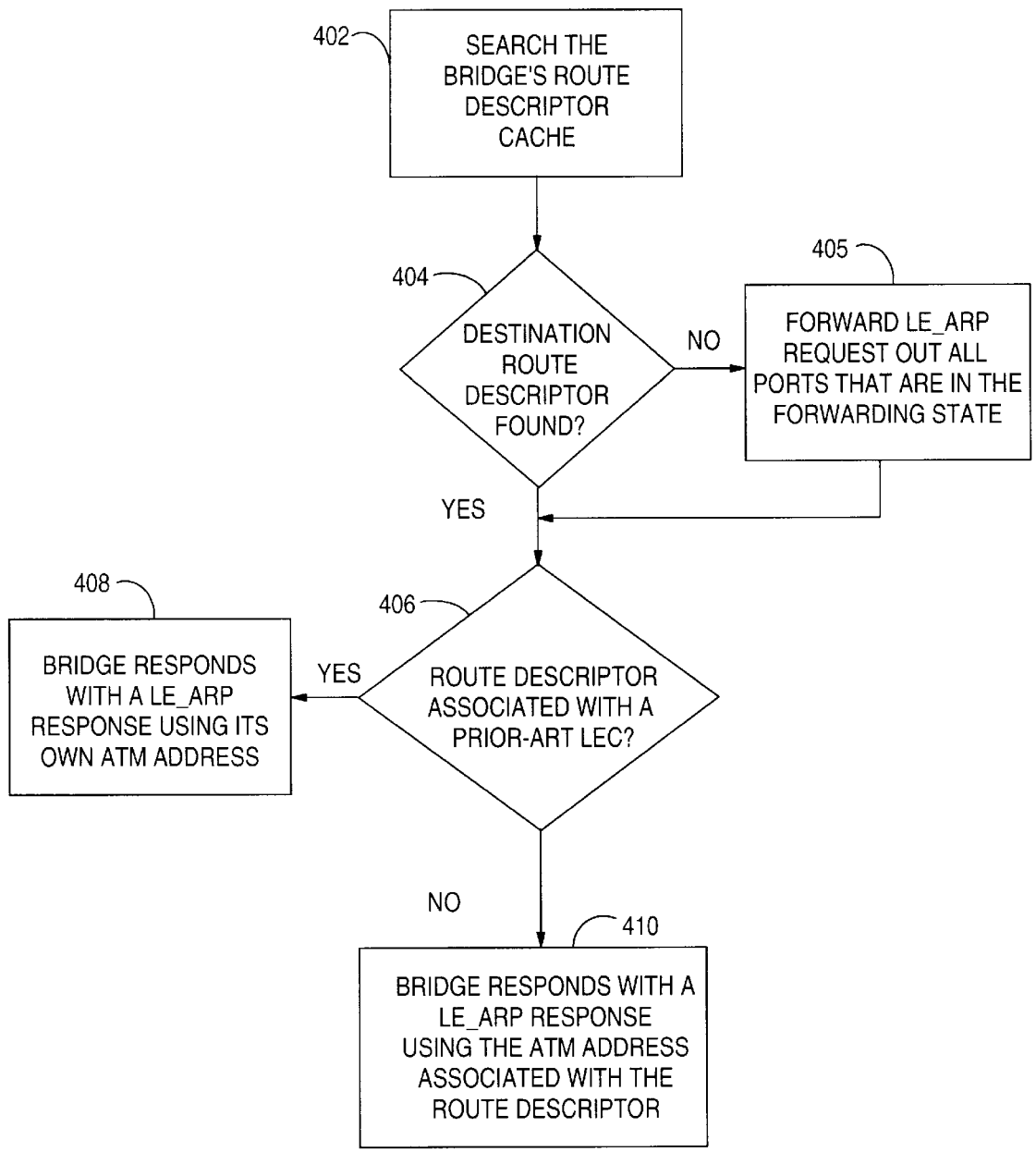
FIG. 4 is a flowchart which illustrates the process of short-cut bridging applied to a source route aware transparent bridge according to the present invention.

FIG. 4 is a flowchart which illustrates the procedures implemented by a source route aware bridge upon receiving a LE_ARP Request with a route descriptor. Initially, the bridge's route descriptor cache will be searched for the route descriptor contained in the LE_ARP Request (402). If the route descriptor is found (404), the bridge determines whether the route descriptor is associated with a prior art LEC or a LEC operating according to the present invention (406). The bridge will respond with a LE_ARP Response using its own ATM address if the route descriptor is associated with a prior art LEC (408). Operating in this manner allows two ATM attached devices to communicate with each other through the bridge. If the route descriptor is associated with a LEC operating according to the present invention, the bridge responds with a LE_ARP Response using the ATM address associated with the route descriptor (410). Returning the ATM address of a destination ATM attached device to an origination ATM attached device allows the origination ATM device to establish a shortcut VCC with the destination ATM device.

If the route descriptor specified in the LE_ARP Request was not found in the bridge's route descriptor cache, the bridge will forward the LE_ARP Request out all ports that are in the forwarding state (405).

At some point, a LES servicing an ELAN will receive the LE_ARP Request and the LES or a proxy LEC on the ELAN will respond with a LE_ARP Response where this Response specifies the ATM address of the device specified by the route descriptor. The bridge will then know the ATM address associated with the route descriptor, and will respond to the original LE_ARP Request with a LE_ARP Response which contains the ATM address associated with the route descriptor (410), or with its own ATM address (408).

Another aspect of the present invention is the enhanced processing of LE FLUSH requests and responses to lower system latency and reduce frame loss. The LE FLUSH protocol implemented according to the present invention is between the two ATM attached devices which are establishing a shortcut VCC. Intermediate devices located in the data path of the two ATM attached devices establishing a shortcut VCC can receive LE FLUSH requests over a data direct VCC or over a multicast VCC. LE FLUSH requests with a requestor LECID matching the LECID of the client are discarded. In addition, LE FLUSH requests received over a data direct VCC or received over a multicast VCC with a target ATM address equal to that of the LEC involved with the shortcut VCC are processed as specified in the LANE version 1.0 specification.

Intermediate bridges receiving other LE FLUSH requests require additional processing by LECs which operate according to the present invention. The LE ARP caches of other LECs operating according to the present invention may be searched for the target ATM address specified in the LE FLUSH request. If a match is found in another LEC's cache, the LE FLUSH request will be forwarded to that LEC. Otherwise, the LE FLUSH request is forwarded by all other active LECs operating according to the present invention. Each LEC uses its own LECID when forwarding LE FLUSH requests, and a new control frame forwarding cache (CFFC) entry is created when a LE FLUSH request is forwarded.

LE FLUSH responses are received over the control direct or control distribute VCC. LE FLUSH responses whose intended destination is a LEC involved in the shortcut VCC can be identified by the LECID and the source ATM address of the frame. Such LE FLUSH responses are processed according to the LANE ver. 1.0 specification.

LE FLUSH responses not intended for the local LEC require additional processing. First, the CFFC is searched. If no matching CFFC entry is found, the LE ARP caches of all active LECs operating according to the present invention may be searched for an ATM address matching the source ATM address. If a match is found in the LE ARP cache of one of the LECs, the LE FLUSH response is forwarded over that LEC. The frame is forwarded without a LECID swap, and a CFFC entry is created indicating the LEC out which the response was forwarded is the originating port.

Otherwise, the LE FLUSH response is forwarded over all active LECs operating according to the present invention. The frame is forwarded without a LECID swap and a new CFFC entry is created.

If a matching entry in the CFFC is found, and the entry indicates a LE FLUSH response, the LE FLUSH response is an echo of a response forwarded by the local LEC to its LES and is discarded. Otherwise, a LECID swap is performed and the LE FLUSH response is forwarded over the recorded LEC to its LES using the control direct VCC, and the CFFC entry is updated such that the op-code field indicates the LE FLUSH response. In either case, the CFFC entry for the frame is not removed. The CFFC entry cannot be removed, after the LE FLUSH response is forwarded, because it is used to detect LE FLUSH response echos. CFC entries are removed using an aging mechanism.

The above descriptions of the present invention are but a few examples of possible implementations of the present invention. Bridges and LECs operating according to the present invention can be implemented in ATM networks having multiple servers and ATM switches.

Also, the networks and methods described above are implemented through a combination of both bridge and optional LES enhancements, such as the capability to configure unique LECID ranges. These solutions allow for the use of bridge spanning trees. These spanning trees prevent loops from occurring in the LAN, and enable redundant mechanisms to be employed in the LAN. Also, unicast frames can be handled by normal LAN emulation services and bridging methods. Furthermore, since LE clients may now communicate directly through shortcut VCCs, the services provided by the multiple LES/BUSs offer the benefits of a distributed LE service.

While the invention has been particularly shown and described with reference to a preferred embodiment, it will be understood by those skilled in the art that various changes in form and detail may be made therein without departing from the spirit and scope of the invention.

What is claimed is:

1. A method of communicating steady-state data between emulated local area networks (ELANS) in an asynchronous transfer mode (ATM) communications network which bypasses intermediate LAN emulation clients (LECs) and bridges, comprising:

providing a bridge unit, wherein the bridge unit includes a bridge and associated LECs, wherein the bridge unit is part of the ATM communications network;

providing an origination ATM attached device and a destination ATM attached device, the origination ATM attached device being attached to a first ELAN, and the destination ATM attached device being attached to a second ELAN, wherein both the first and second ELANs are defined on the ATM communications network;

sending a request for an ATM address associated with the destination ATM attached device from the origination ATM attached device to the bridge unit, via the first ELAN;

determining the ATM address associated with the destination ATM attached device; and responsive to said request, returning the ATM address associated with the destination ATM attached device from the bridge to the origination ATM attached device, wherein the origination ATM attached device establishes a shortcut data direct virtual channel connection (shortcut VCC) with the destination ATM attached device using the ATM address associated with the destination ATM attached device.

2. The method as recited in claim 1, further comprising:

providing additional ELANs between the origination ATM attached device and the destination ATM attached device which are interconnected by one of transparent bridges and source route aware transparent bridges.

3. The method as recited in claim 1, wherein the request for the ATM address associated with the destination ATM attached device contains a MAC address associated with the destination ATM attached device.

4. The method as recited in claim 3, wherein the determining step includes using the MAC address associated with the destination ATM attached device to find the ATM address associated with the destination ATM attached device in a cache of MAC address and ATM address pairs maintained by the bridge unit.

5. The method as recited in claim 1, wherein the determining step includes forwarding the request for the destination ATM address to the destination ATM attached device.

6. The method as recited in claim 1, wherein the request for the ATM address associated with the destination ATM attached device contains a route descriptor associated with the destination ATM attached device.

7. The method as recited in claim 6, wherein the determining step includes using the route descriptor associated with the destination ATM attached device to find the ATM address associated with the destination ATM attached device in a cache of route descriptors and ATM address pairs maintained by the bridge.

8. The method as recited in claim 1, wherein the determining step includes forwarding the request for the ATM address associated with the destination ATM attached device to a LAN emulation server (LES) serving the ELAN to which the destination ATM attached device is connected.

9. The method as recited in claim 1, wherein the returning step includes modifying a response to the request to include the ATM address associated with the destination ATM attached device.

10. The method as recited in claim 1, further comprising:
exchanging flush messages according to a flush protocol between the origination and destination ATM attached devices.

11. The method as recited in claim 1, further comprising:
preventing loops in the interconnection of intermediate ELANs which connect the origination and the destination ATM attached devices by implementing a standard bridge spanning tree protocol.

12. The method as recited in claim 1, further comprising:
forwarding unicast frames using intermediate ELANs and bridges which connect the origination and the destination ATM attached devices until a shortcut VCC is formed.

13. The method as recited in claim 1, wherein the destination ATM attached device is connected to a different ATM switch than the origination ATM attached device.

14. The method as recited in claim 1, further comprising:
forwarding address resolution protocol messages using intermediate ELANs and bridges which connect the origination and the destination ATM attached devices.

15. An asynchronous transfer mode (ATM) communications network, having emulated local area networks (ELANs), which communicates steady-state data between the ELANs in a manner which bypasses intermediate LAN emulation clients (LECs) and bridges, comprising:
a bridge unit, wherein the bridge unit includes a bridge and associated LECs, wherein the bridge unit is part of the ATM communications network;
an origination ATM attached device and a destination ATM attached device, the origination ATM attached device being attached to a first ELAN, and the destination ATM attached device being attached to a second ELAN, wherein both the first and second ELANs are defined on the ATM communications network;
the communications network being operable in a first mode of operation, wherein
the origination ATM attached device sends a request for an ATM address associated with the destination ATM attached device to the bridge unit, via the first ELAN; and
responsive to said request the bridge returns the ATM address associated with the destination ATM attached device to the origination ATM attached device, wherein the origination ATM attached device establishes a shortcut data direct virtual channel connection with the destination ATM attached device using the ATM address associated with the destination ATM attached device.

16. The network as recited in claim 15, further comprising:
additional ELANs between the origination ATM attached device and the destination ATM attached device which are interconnected by one of transparent bridges and source route aware transparent bridges.

17. The network as recited in claim 15, wherein the request for the ATM address associated with the destination ATM attached device contains a MAC address associated with the destination ATM attached device.

18. The network as recited in claim 17, wherein the first mode of operation further includes the bridge using the MAC address associated with the destination ATM attached device to find the ATM address associated with the destination ATM attached device in a cache of MAC address and ATM address pairs.

19. The network as recited in claim 15, wherein the first mode of operation further includes the bridge forwarding the request for the destination ATM address to the destination ATM attached device.

20. The network as recited in claim 15, wherein the request for the ATM address associated with the destination ATM attached device contains a route descriptor associated with the destination ATM attached device.

21. The network as recited in claim 20, wherein the first mode of operation further includes the bridge using the route descriptor associated with the destination ATM attached device to find the ATM address associated with the destination ATM attached device in a cache of route descriptors and ATM address pairs.

22. The network as recited in claim 15, wherein the first mode of operation further includes the bridge forwarding the request for the ATM address associated with the destination ATM attached device to a LAN emulation server (LES) serving the ELAN to which the destination ATM attached device is connected.

23. The network as recited in claim 15, wherein the first mode of operation further includes the bridge modifying a response to the request to include the ATM address associated with the destination ATM attached device.

24. The network as recited in claim 15, wherein the first mode of operation further includes the origination and destination ATM attached devices exchanging flush messages according to a flush protocol.

25. The network as recited in claim 15, wherein a standard bridge spanning tree protocol prevents loops in connections between intermediate ELANs which connect the origination and the destination ATM attached devices.

26. The network as recited in claim 15, further comprising:

intermediate ELANs and bridges which connect the origination and the destination ATM attached devices and which forward unicast frames until a shortcut VCC is formed.

27. The network as recited in claim 15, wherein the destination ATM attached device is connected to a different ATM switch than the origination ATM attached device.

28. The network as recited in claim 15, further comprising:

intermediate ELANs and bridges which connect the origination and the destination ATM attached devices and forward address resolution protocol messages.

29. The method as recited in claim 1, further comprising:

providing a redundant bridge unit in the ATM communications network, wherein the redundant bridge unit assumes the duties of the bridge unit through implementing a standard bridge spanning tree protocol.

30. The network as recited in claim 15, further comprising:

a redundant bridge unit attached to the ATM communications network, wherein the redundant bridge unit assumes the duties of the bridge unit through implementing a standard bridge spanning tree protocol.

31. The method as recited in claim 1, further comprising:

configuring the ATM communications network with unique LECIDs using LAN emulation servers, wherein the LECs in the ATM communications network are uniquely identifiable.

32. The network as recited in claim 15, wherein the first mode of operation further includes:

LAN emulation servers configuring the LECs in the ATM communications network with unique LECIDs, wherein the LECs are uniquely identifiable.

33. The method as described in claim 1, further comprising:

providing a plurality of LAN emulation servers (LESs)/broadcast and unknown servers (BUSes) connected to the ATM communications network, wherein the plurality of LES/BUSes provide distributed LAN emulation (LE) services to LE clients attached to the ATM communications network.

34. The network as described in claim 1, further comprising:

a plurality of LAN emulation servers (LESs)/broadcast and unknown servers (BUSes) connected to the ATM communications network, wherein the plurality of LES/BUSes provide distributed LAN emulation (LE) services to LE clients attached to the ATM communications network.

* * * * *